United States Patent
Dube et al.

(10) Patent No.: US 8,453,005 B2
(45) Date of Patent: *May 28, 2013

(54) SYSTEM AND METHOD FOR CONTAINER MONITORING, REAL TIME AUTHENTICATION, ANOMALY DETECTION, AND ALERTS

(75) Inventors: Roger R. Dube, Pittsford, NY (US); Richard L. Morgenstern, Boca Raton, FL (US)

(73) Assignee: Digital Authentication Technologies, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/469,393

(22) Filed: May 20, 2009

(65) Prior Publication Data
US 2009/0228964 A1    Sep. 10, 2009

Related U.S. Application Data

(63) Continuation of application No. 10/987,553, filed on Nov. 13, 2004, now Pat. No. 7,551,739.

(60) Provisional application No. 60/520,094, filed on Nov. 13, 2003.

(51) Int. Cl.
    *G06F 1/00*    (2006.01)

(52) U.S. Cl.
    USPC .................. 713/500; 713/156; 380/258

(58) Field of Classification Search
    USPC ........... 713/156, 500; 701/213, 219; 380/258; 710/213, 219
    See application file for complete search history.

(56) References Cited

U.S. PATENT DOCUMENTS

| | | | | |
|---|---|---|---|---|
| 6,064,706 A | * | 5/2000 | Driskill et al. | 375/372 |
| 7,231,044 B2 | * | 6/2007 | Dube | 380/258 |
| 7,551,739 B2 | * | 6/2009 | Dube et al. | 380/258 |

* cited by examiner

*Primary Examiner* — Eleni Shiferaw
*Assistant Examiner* — Paul Callahan
(74) *Attorney, Agent, or Firm* — Patent Venture Group; Joe A. Brock, II (57) ABSTRACT

An invention is provided for monitoring an item, such as a container. The invention includes a computer in communication with a receiver that receives signals from a remote source. A transmitter in communication with the computer receives values from the computer based on the signals received from the remote source. These values are then transmitted to a security device associated with the item, which includes an authentication table comprising a plurality of initial values. The security device then records values transmitted from the transmitter. The values can be jitter values, with each jitter value being a difference in arrival times of at least two timing signals from the same remote source.

4 Claims, 5 Drawing Sheets

SYSTEM AND METHOD FOR CONTAINER MONITORING, REAL TIME AUTHENTICATION, ANOMALY DETECTION, AND ALERTS

CROSS REFERENCE TO RELATED APPLICATIONS

This application is a continuation of U.S. patent application Ser. No. 10/987,553, filed Nov. 13, 2004, entitled "Method For Container Monitoring, Real Time Authentication, Anomaly Detection And Alerts," now U.S. Pat. No. 7,551,739, which claims the benefit of U.S. Provisional Patent Application having serial number 60/520,094, filed on Nov. 13, 2003, and entitled "Method for Container Monitoring, Real Time Authentication, Anomaly Detection and Alerts," both of which are hereby incorporated by reference.

BACKGROUND OF THE INVENTION

1. Field of the Invention

This invention relates generally to container monitoring and anomaly detection, and more particularly to container monitoring and anomaly detection using physics-based location signatures for authentication and location verification.

2. Description of the Related Art

International trade has become an increasingly important engine for economic growth in the U.S. Thirty years ago imports and exports accounted for only 8 percent of the Gross Domestic Product (GDP). By 1999, foreign trade was almost 27 percent of GDP. Economists predict that trade will double by 2010.

Each year, more than 16 million containers arrive in the United States by ship, truck, and rail. Ninety-five percent of U.S. international cargo, by volume, is transported by ocean. More than half of these goods arrive by ocean-going cargo containers. In 2001, U.S. Customs processed more than 214,000 vessels and 5.7 million sea containers. While ports connect consumers with global products, and farmers and manufacturers with overseas markets, ports also serve as local economic engines.

Ports generate jobs and opportunities that allow businesses to flourish. Small businesses and manufacturers send their products to global market through ports. Commodities such as fruit, corn, forest products, iron ore, machinery and mobile homes move across the country and are loaded on vessels bound for other countries. Today, containerships carry about 55 percent of U.S. international maritime trade based on value, and eight percent in terms of tonnage. Containerized shipments in the U.S. doubled in the last ten years and are expected to double again every 10 to 15 years. The large economic and social dependence that the United States and other countries place on containerships, combined with the large volume and worldwide access, make these containers a natural target for acts of terrorism.

Terrorist groups have vowed to cripple the U.S. and world economy. A terrorist attack using a sea container can prove detrimental to this portion of the global trading system by bringing the worldwide movement and processing of ocean-going cargo containers to a halt. The strategic placement of an explosive device within a container that is carried into a port of high population such as New York or Los Angeles, followed by a carefully timed detonation, can have disastrous results in the loss of human lives and on the worldwide economy as shipping comes to a virtual standstill.

Hence, a proactive stance by Customs in screening sea containers can significantly contribute to the agency's overall efforts to secure the borders against dangers that might be introduced through commercial traffic. To this end, plastic labels, paper labels, and mechanical seals have been developed to assist Customs in sea container screening. Unfortunately, classic plastic labels, paper labels, and mechanical seals are easily compromised and replaced with "dummy" or "twin" seals. Moreover, this entire class of tamper-evident technologies typically requires one-by-one inspections of the seals as the containers are removed. As a result, these technologies do not provide the level of security and awareness required in today's high threat environment.

Another prior art approach has been the use of electronic locks and seals with radio frequency identification (RFID) capabilities. These devices allow the locks and seals to be "pinged" or queried by remote transmitters. When combined with additional sensors of vibration, light level, heat, and humidity, these locks can provide valuable information about the state of each container. These locks typically have battery backup, memory and time and date stamps so that all openings and closings of the lock can be recorded for later queries.

Unfortunately, these devices contain no information about the location of the container either within the shipping vessel or in terms of geo-location. Moreover, these devices do not protect the data stored within the lock/seal or the communication with the querying tool. Consequently, interception and masquerading of signals and the status of each container can be compromised.

There is a need for a non-spoofable electronic handshake between each container and the authorized querying device so that interception and eavesdropping cannot occur. Moreover, there is a need to add the ability of both the querying tool and each container to "recognize" the authenticity of the other party in a communication in a non-spoofable manner.

In view of the foregoing, there is a need for systems and method for authenticating that the contents of containers, such as those commonly used in the shipping and transportation industries, have not been tampered with since they were sealed. The method should provide an authorized monitoring system to continually communicate with and sense the status of these containers in a manner that immediately notifies a local or remote authority should a breach occur. This notification should further provide detailed geo-location and time coordinates for the container at the time of breach. In order to avoid opportunities for electronic fraud, there is also a need to include in the communication between the authorized monitoring system and each container a signature that is uniquely generated by the monitoring system and can be "recognized as authentic" by the container in real time or in a subsequent audit. Moreover, there is a need to facilitate the rapid location and identification of containers whose security has been breached. Finally, it is imperative that vessels whose contents have maintained their integrity during shipment be granted an "expedited" entry through a perimeter security system above those ships whose contents are suspect or otherwise unable to provide a high level of assurance that the contents are secure and trustworthy.

SUMMARY OF THE INVENTION

Broadly speaking, embodiments of the present invention address these needs by providing a system and method for container monitoring and real time authentication, which makes use of an authentication table that comprises a unique table of secrets to be shared between two trusted parties. Copies of the authentication table at both trusted parties are then employed in a challenge/response process to aid in the authentication of one to the other.

In one embodiment, a system is disclosed for monitoring an item, such as container on a containership. The system includes a computer in communication with a receiver that receives signals from a remote source. A transmitter in communication with the computer receives values from the computer based on the signals received from the remote source. These values are then transmitted to a security device associated with the item, which includes an authentication table comprising a plurality of initial values. The security device then records the values transmitted from the transmitter. In one aspect, the values can be jitter values, with each jitter value being a difference in arrival times of at least two timing signals from the same remote source. In this case the initial values of the authentication table comprise initial jitter values received at a port of origin. In addition, a port computer located at the port of origin can be included in the system. The port computer can include a secure database storing a plurality of item profiles for related items, with each item profile having a copy of the authentication table stored in the security device associated with the related item. Further, the values from the computer can be combined jitter values based on the initial jitter values and the jitter values received from the receiver. For example, each combined jitter value can be generated by adding an initial jitter value to a jitter value received from the receiver. Optionally, the computer can query the security device prior to allowing the transmitter to transmit a new value to the security device. For example, the computer can compare a value stored in the authentication table of the security device with an expected value during the query.

A method for monitoring an item is disclosed in an additional embodiment of the present invention. The method includes receiving timing signals from a remote source at a computer, and sending values based on the timing signals from the computer to a transmitter. The values are then transmitted from the transmitter to a security device associated with an item. As above, the security device includes an authentication table having a plurality of initial values. Once received at the security device, the values are recorded in the authentication table. As mentioned previously, the values can be jitter values, with each jitter value being a difference in arrival times of at least two timing signals from the same remote source. Also, the initial values of the authentication table can comprise initial jitter values received at a port of origin. Further, the values from the computer can be combined jitter values based on the initial jitter values and the jitter values received from the receiver. For example, each combined jitter value can be generated by adding an initial jitter value to a jitter value received from the receiver. Optionally, the security device can be queried prior to allowing the transmitter to transmit a new value to the security device. For example, a value stored in the authentication table of the security device can be compared with an expected value during the query operation.

A security device for monitoring an item is disclosed in a further embodiment of the present invention. The security device includes a memory, a processor in communication with the memory, and a receiver in communication with the processor, which is capable of receiving signals from a transmitter. The security device also includes an authentication table stored in the memory, which includes a plurality of initial values. In operation, the security device records values received via the receiver in the authentication table. As above, the values can be jitter values, with each jitter value being a difference in arrival times of at least two timing signals from a single remote source. Also, the initial values of the authentication table can comprise initial jitter values received at a port of origin. Generally the values from the receiver are combined jitter values based on the initial jitter values and the jitter values received from the receiver. Such a combined jitter value can be generated by adding an initial jitter value to a jitter value received from the receiver.

The use of jitter values is of particular advantage in the present invention because the jitter values have their origins in a physical process that lies along a line of sight between a distant remote source and a passive RF receiver and are measured in real time at the location of the receiver. These physics-based values are incalculable and non-spoofable. Hence, only someone with an identical receiver at the same location at the same microsecond will receive the same signal as another receiver.

When using the embodiments of the present invention, the absence of an item, such a container, from an authorized zone during any portion of the querying results in the absence of a significant and easily detected sequence of table values in that container's authentication table, allowing easy identification and flagging of suspicious containers for purposes of activating a duress code on the vessel and later inspection. The absence of the proper jitter values from a portion of a container's authentication table can then be used to identify an anomaly relating to the container (e.g., when and where the container was opened during its transport or absent from the vessel). This can then be correlated to the history of generated signal and associated with the vessel's absolute geo-location to place the event in space as well as time. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a container monitoring and real time authentication system. In general, embodiments of the present invention create an authentication table, which is a unique table of secrets to be shared between two trusted parties. To create the authentication table, timing signals at two different frequencies arriving from the same remote source are captured at a radio frequency (RF) receiver and the difference in the timing signal arrival times is extracted and compared. These differences in arrival times are converted to discrete numbers and stored into the authentication table in non-volatile memory. Copies of the authentication table at both trusted parties are then employed in a challenge/response process to aid in the authentication of one to the other.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention. In addition, the term "container" as used herein refers to any item to be monitored. In the following description a container is described in terms of a holding unit. However, a container may also be any other item to be monitored, such as a suitcase or laptop computer. In addition, although the following description is presented in terms of a sea voyage, embodiments of the present invention can operate in any other environment, such as an air voyage, land voyage, or space transfer. Finally, although embodiments of the present invention will be described in terms of monitoring during a voyage, the present invention can be utilized to monitor items not in transit, such as containers in a warehouse, or devices within room whose contents needs to be monitored, such as a safe or conference room several laptops that need monitoring.

Figure 1:
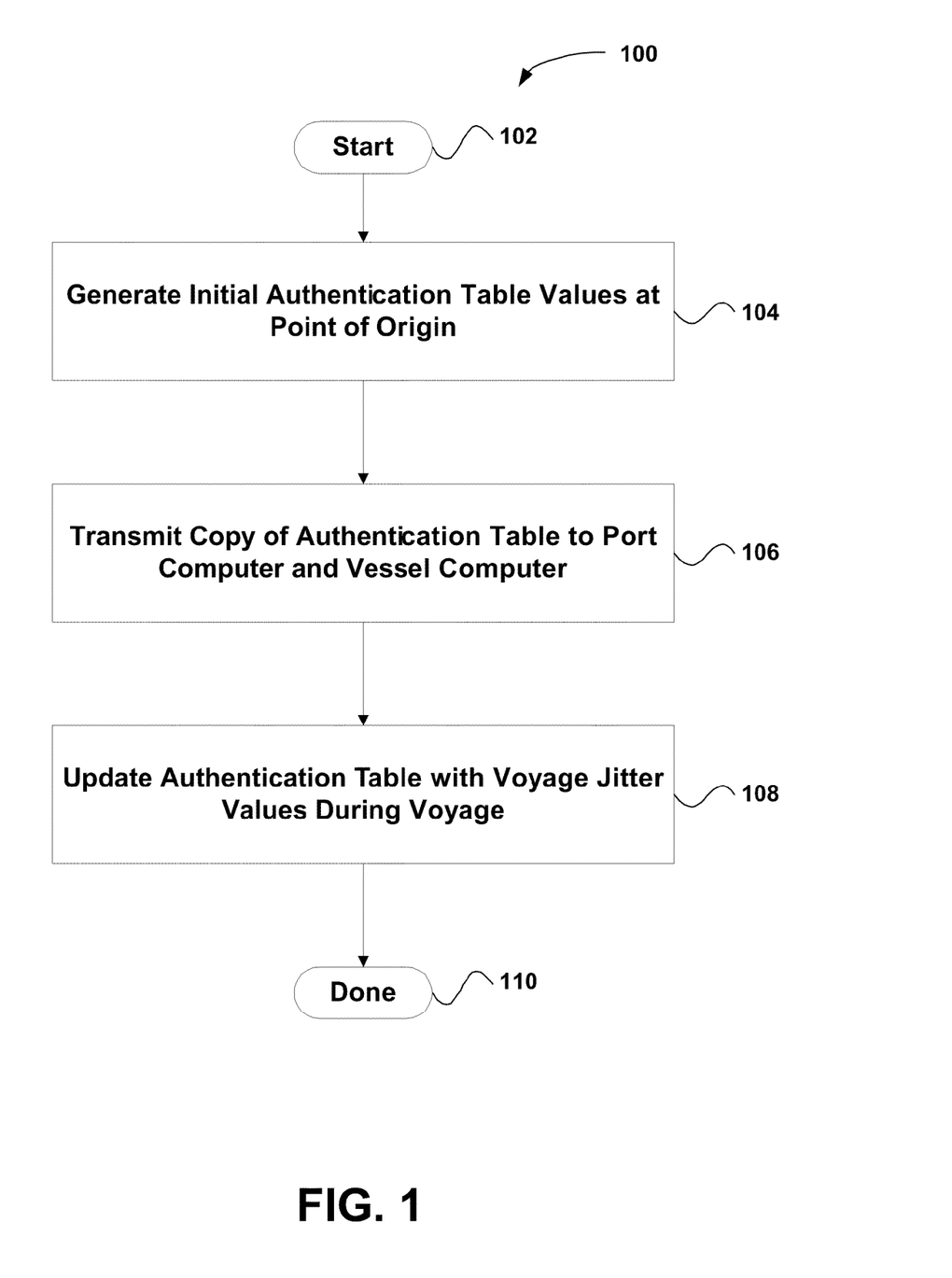
FIG. 1 is a flowchart showing a method for container monitoring and authentication, in accordance with an embodiment of the present invention.

FIG. 1 is a flowchart showing a method 100 for container monitoring and authentication, in accordance with an embodiment of the present invention. In an initial operation 102, preprocess operations are performed. Preprocess operations can include, for example, creating a cargo manifest, sealing the containers, determining the voyage route, and other preprocess operations that will be apparent to those skilled in the art after a careful reading of the present disclosure.

In operation 104, authentication table values are generated at the point of origin for the container voyage. For example, when containers are being transported on a containership, the point of origin will be the port of origin. The authentication table of the embodiments of the present invention is used to aid in monitoring and authenticating a container. As will be explained in greater detail subsequently, embodiments of the present invention measure the difference in time delay between timing pulses arriving from distant sources at a receiver. This delay, referred to as "jitter," is not treated as a nuisance to be defeated, but rather is employed as a source of physics-based, location specific secrets whose values cannot be predicted, calculated or otherwise guessed. These secrets can be exchanged between two parties and then used in a challenge/response process to allow the authentication of the identities of the two parties that share those secrets. Moreover, the tables of secrets held by both parties can be updated with new information so that the tables remain dynamic and therefore more difficult to defeat.

In one embodiment, a security device having an authentication table stored in memory and a radio frequency (RF) receiver is attached to a container. The container is then sealed at a port of origin, preferably by a trusted party having a unique set of personal jitter values that can be used to digitally "sign" the seal. The RF receiver on the security device is then utilized to receive jitter values and fill the authentication table in the memory of the security device, as described below with reference to FIG. 2.

Figure 2:
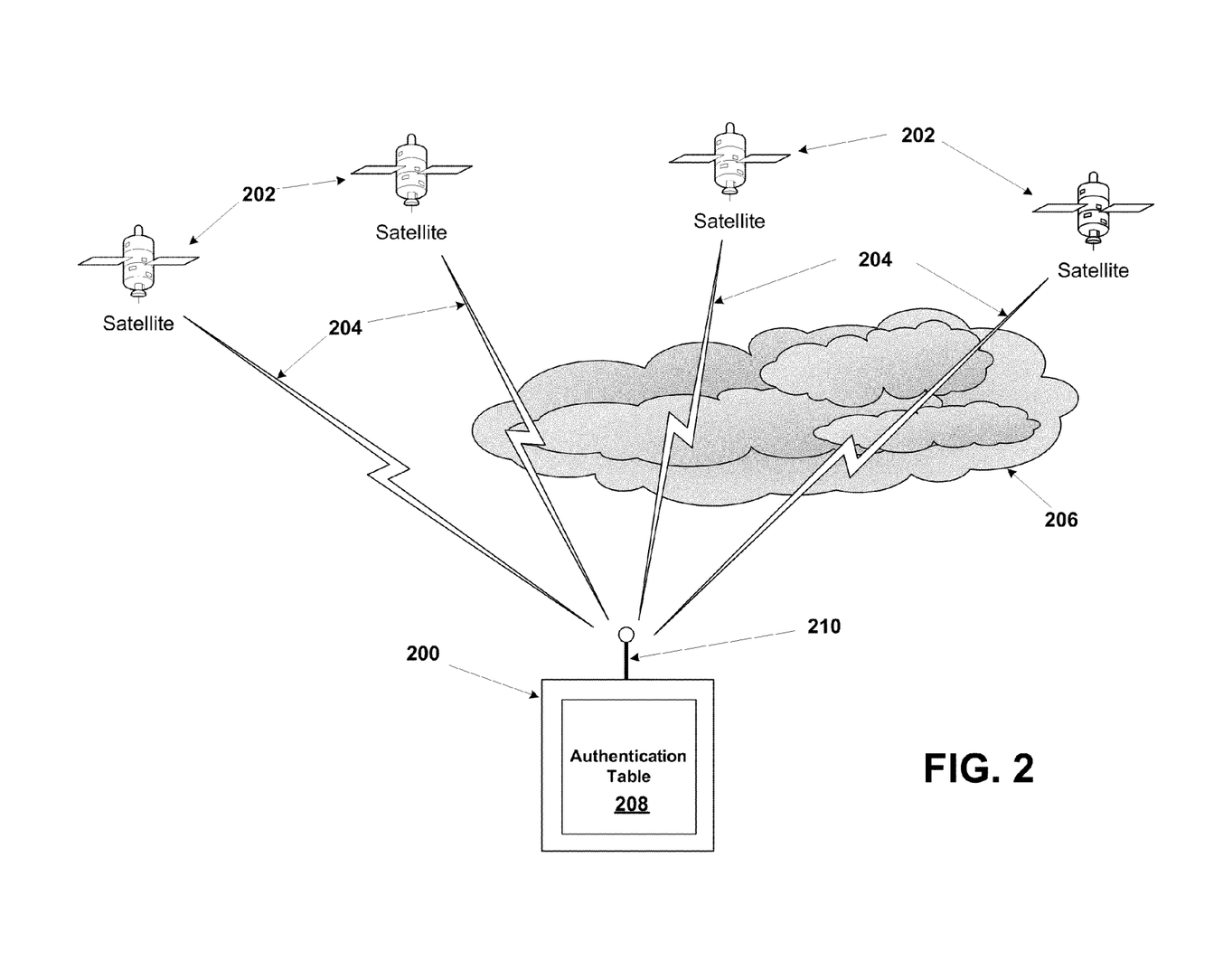
FIG. 2 is an illustration showing a security device that utilizes GPS data to facilitate authentication, in accordance with an embodiment of the present invention.

FIG. 2 is an illustration showing a security device 200 that utilizes GPS data to facilitate authentication, in accordance with an embodiment of the present invention. The security device 200 includes an authentication table 208 stored in memory and an antenna 210. In addition, the security device 200 can include a processor to process received values. Typically, the security device 200 is coupled to a container to be monitored. It should be noted that the security device 200 can be mechanical, electric, electromechanical, or any other mechanism capable of securing a container. Moreover, the security device 200 does not necessarily have to physically secure the container, security can be provided by alarms or other means of informing a user as to a container security breach.

The security device 200 makes use of remote signal sources, such as satellites 202 of the Global Positioning System (GPS), to provide timing signals 204. Although the following description is in terms of GPS technology, it should be noted that any external timing signals can be utilized by the embodiments of the present invention. As will be described in greater detail below, any external timing signals at two or more different frequencies arriving from the same remote source can be used. Further exemplary external timing signals can include cell towers, LORAN, and Global Orbiting Navigational Satellite systems (GLONASS). In addition, a multiplicity of such timing signal pairs can be utilized to generate more complex authentication tables.

The security device 200 also includes, among other things, electronics that process the timing signals 204. The electronics process the timing signals 204 and maintain and update the authentication table 208, as will be described subsequently.

The timing signals 204 include encoded time and date information that can be extracted by the electronics of the security device 200. By triangulation of signals from three satellites 202, the security device 200 can pinpoint the current geophysical location of the attached container anywhere on earth, generally to within a few meters. However, variations in the ionosphere and atmosphere 206 due to weather, barometric pressure, solar activity, and other variable and unpredictable parameters cause the purity of the timing signals 204 to fluctuate. In particular, the variations in the ionosphere and atmosphere cause unpredictable delays in the timing signals 204. To compensate for these variances, each satellite 202 of the GPS system transmits two timing signals 204 at two different frequencies (L1 and L2). In further embodiments, sideband frequencies from the same timing source can be used to allow extraction of line of sight variations in delay time by rejecting "common mode" variations.

Figure 3:
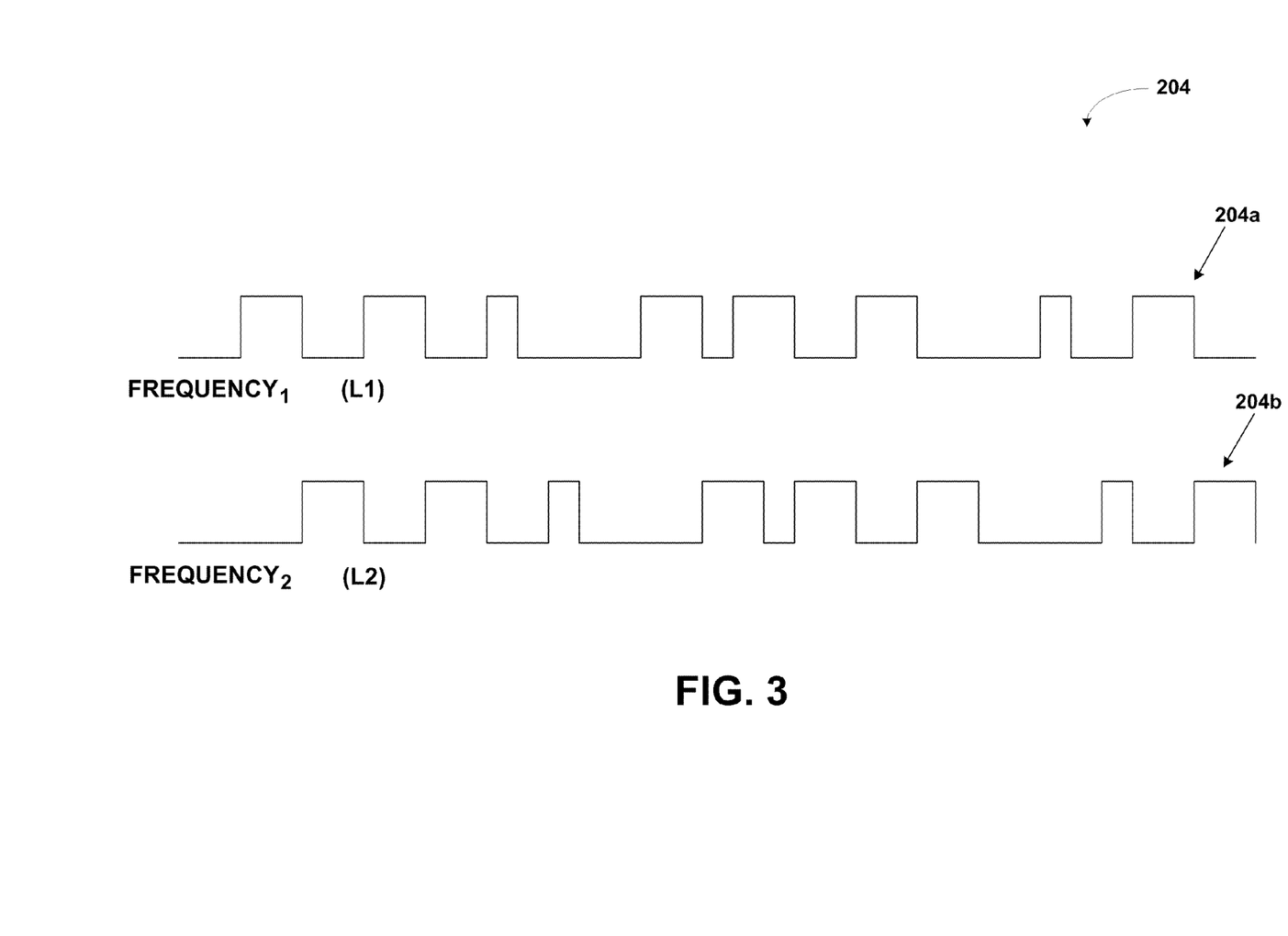
FIG. 3 is a timing diagram illustrating timing signals from a satellite of a GPS system.

FIG. 3 is a timing diagram illustrating timing signals 204 from a satellite of a GPS system. The timing signals 204 include a first timing signal 204a at a first frequency and second timing signal 204b at a second frequency. As FIG. 3 illustrates, the first and second timing signals 204a and 204b are offset from each other as a result of atmospheric variances. The delay of a radio signal is inversely proportional to the square of the carrier frequency (i.e. L2 will be delayed more than L1) and proportional to the total number of electrons along the path from the satellite 202 to the security device 200. The total number of electrons will vary according to the current solar activity, time of day (at the receiver), and longitude and latitude of the receiver. It is known to one practiced in the art that by measuring the delay between signals L1 and L2 from a particular satellite, one can calculate the effect due to the ionosphere and troposphere and correct for the variation, thereby improving positional accuracy. To compensate for the atmospheric variances, the embodiments of the present invention normalize the first and second timing signals 204a and 204b before determining geophysical location. As a result, accuracy for the location calculation is greatly improved.

In addition, embodiments of the present invention utilize the variances in timing signals 204 as a source for an unpredictable random number, referred to hereinafter as a "jitter value." In particular, measurement of the fluctuation in timing signal delay produces a random and unpredictable number whose value depends on the moment-to-moment value of the various parameters along the path from the satellite 202 to the security device 200. Therefore, this delay is specific to each satellite 202 and security device 200 at a specific time and a specific location, and is extremely difficult, if not impossible, to calculate remotely. Moreover, each GPS satellite 202 is continually moving along its orbit, thereby introducing additional delay variations as different parts of the Earth's atmosphere are sequentially interposed between the satellite and the security device 200. This adds an additional element of variability and unpredictability, which extends beyond just variations in the atmospheric line-of-sight conditions. Hence, essentially the only way to obtain such a delay is by direct measurement at the specific security device 200. It should be noted that although the present description refers to timing signals L1 and L2 from GPS satellites, any timing signals that share the same original source but propagate at different frequencies, such as sidebands from a TV or FM station, can be employed to allow the extraction of similar jitter measurement.

As illustrated in FIG. 2, the RF antenna 210 on the security device 200 is utilized to receive jitter values and fill the authentication table 208 in the memory of the security device 200. In one embodiment, the authentication table 202 is a matrix, wherein each cell of the matrix stores a jitter value from a particular remote source (ex. a satellite 202) at a particular time. The security device 200 and attached container is allowed to sample a plurality of jitter values over a particular time period. As each jitter value is received, the jitter value is stored in the authentication table. This is performed for each container and attached security device 200 that will be transported on a particular voyage. As a result, each container will include a security device 200 having an authentication table 208 storing jitter values unique to that particular container.

Figure 4:
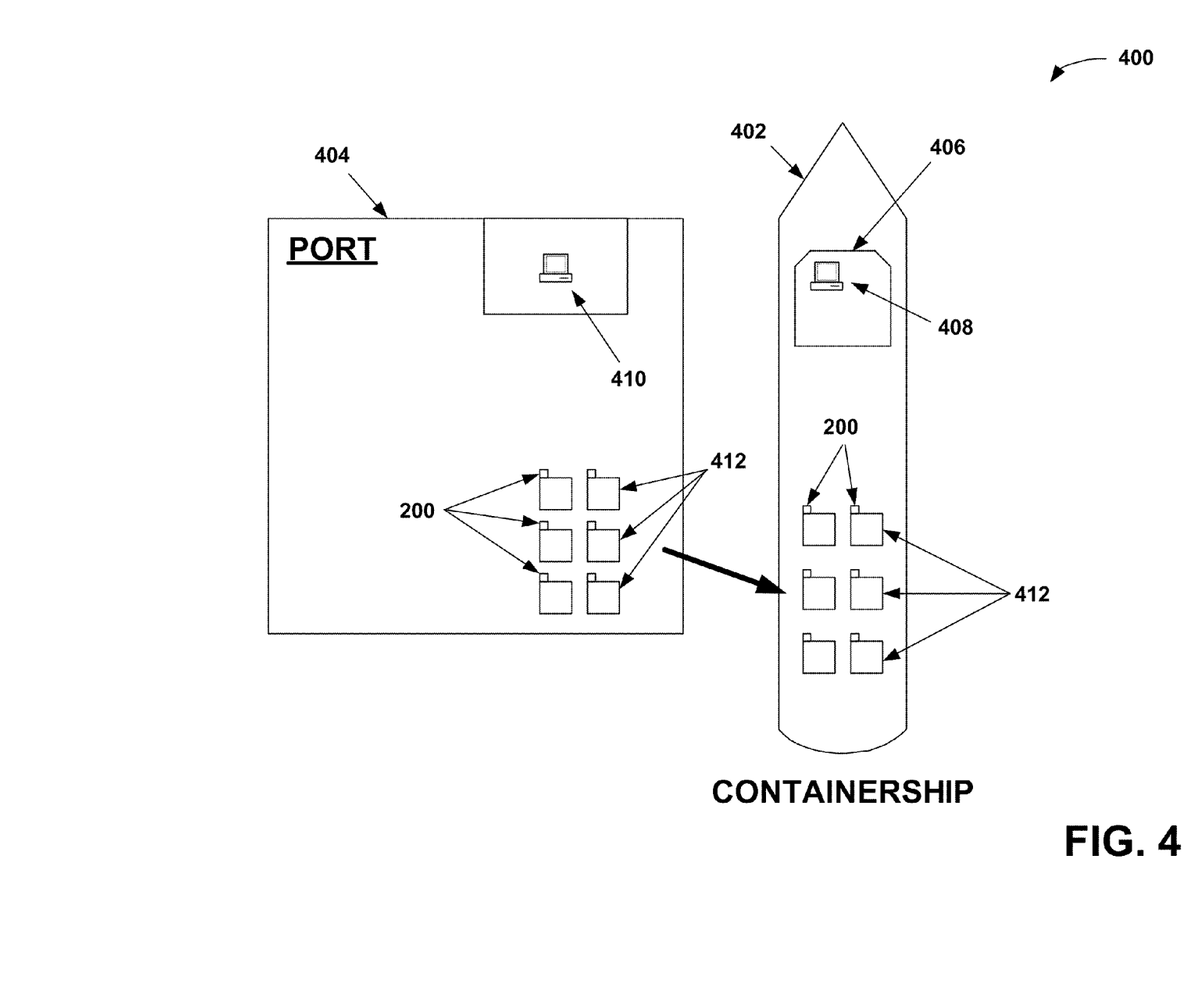
FIG. 4 is a diagram showing a container monitoring and authentication system, in accordance with an embodiment of the present invention.

In operation 106, a copy of the authentication table 208 is transmitted to a port computer and a voyage computer. FIG. 4 is a diagram showing a container monitoring and authentication system 400, in accordance with an embodiment of the present invention. FIG. 4 illustrates how embodiments of the present invention operate in the context of a sea voyage. As such, FIG. 4 shows a containership 402 docked at a port of origin 404 for the voyage. A bridge 406 resides on the containership 402 and includes a voyage computer 408. Similarly, the port 404 includes a port computer 410.

As described above in operation 104, a plurality of security devices 200 each attached to a container 412 are allowed to sample jitter values and store the values in the authentication table of each security device 200. Since each security device 200 is located slightly differently from each other security device 200 and since each container 412 is sealed at different times when the jitter values have changed entirely, each security device 200 will include a unique authentication table of jitter values.

In operation 106, each security device 200 transmits a copy of its individual authentication table to the port computer 410. In one embodiment, the port computer 410 includes a secure database storing a profile for each container 412 that is part of the voyage. Each profile entry can include, for example, the contents of the container, the destination of the container, and other pertinent information. In addition, each profile includes the authentication table of a particular container 412, which was captured within the attached security device 200 at the port of origin 404. A copy of each authentication table also is transmitted to the voyage computer 408 on the bridge 406 of the containership 402. In one embodiment, a copy of the secure database stored on the port computer 410 is transmitted to the voyage computer 408, resulting in both the port computer 410 and the voyage computer 408 having a copy of the same secure database storing profiles for each container 412 on the voyage. Once the authentication tables have been generated, the containers 412 with attached security devices 200 are stowed on the containership 402.

Figure 5:
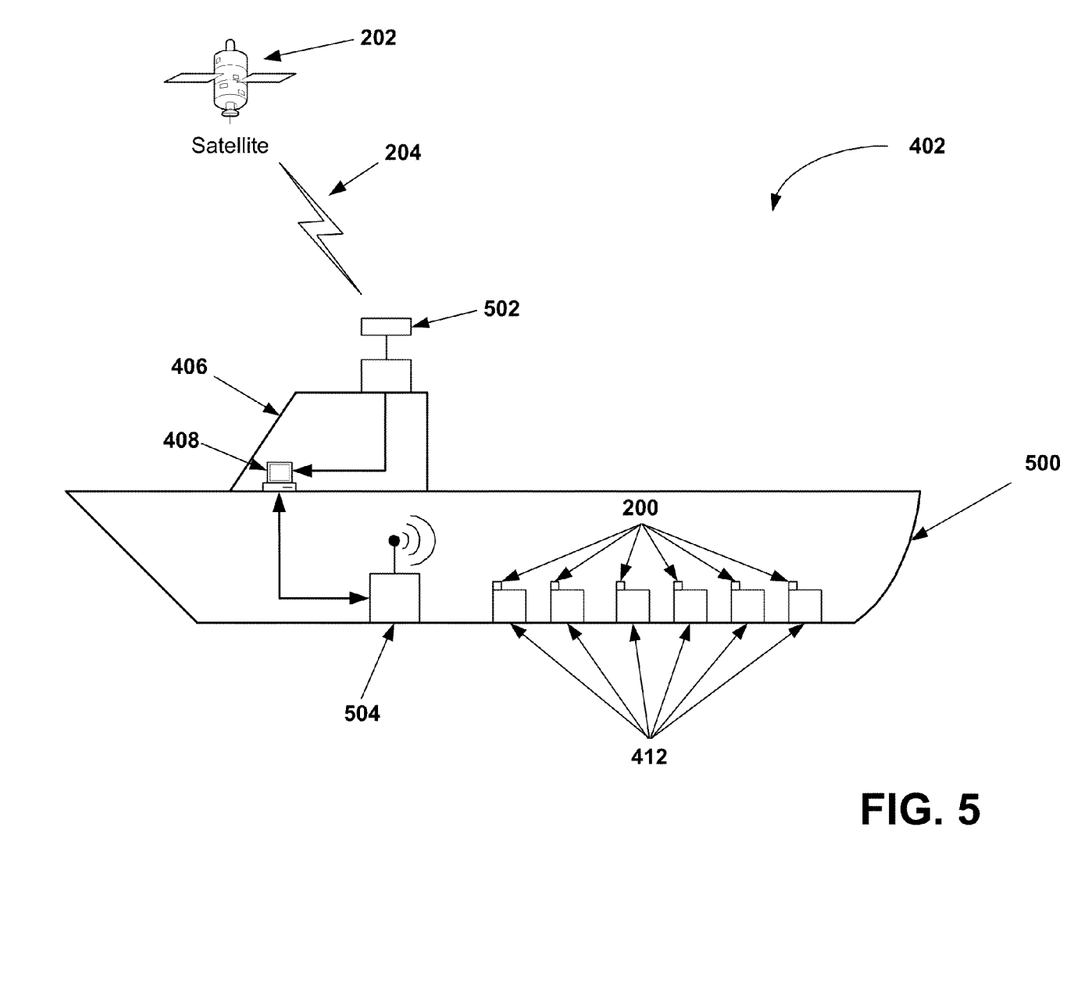
FIG. 5 is a diagram showing an exemplary containership utilizing a container monitoring and authentication system of the embodiments of the present invention during a sea voyage.

Turning back to FIG. 1, the authentication table of each container is updated during the voyage. FIG. 5 is a diagram showing an exemplary containership 402 utilizing a container monitoring and authentication system of the embodiments of the present invention during a sea voyage. The containership 402 includes a hull 500 and a bridge 406, which includes a voyage computer 408 in communication with a ship RF receiver 502. The voyage computer 408 also is in communication with a ship transceiver 504, which is used to communicate with the each security device 200 attached to each container 412.

Generally, RF signals are prevented from penetrating the hull 500 of the containership because the hull 500 acts similar to a Faraday Cage. Hence, location data generally cannot be transmitted directly to the security devices 200 within the hull 500 from outside the hull 500 using RF transmitters. To overcome this difficulty, embodiments of the present invention mount a ship RF receiver 502 outside the hull 500 of the ship 402 and retransmit received signals 204 into the hull 500. That is, the ship RF receiver 502 receives timing signals 204 from a remote source, such as a satellite 202. These signals are then processed and recorded as jitter values in the voyage computer 408. Then, combined jitter values based on the newly recorded jitter values are sent to the ship transceiver 504 and broadcast to the plurality of security devices 200 within the hull 500. It should be noted that an alternate or additional wired path can complement or replace the wireless path should such signals be unavailable or otherwise undesirable.

In operation, jitter values are extracted at random from the authentication table stored in the voyage computer 408. The precise method for the random selection of values is not important, but can include techniques in which entire rows of values are selected and the randomness is maintained at the level of the row number, or specific cells can be selected at random from the entire table. Independent of the selection process used to pull numbers from the authentication table, this selected sequence of numbers is then converted to analog values using techniques know to those skilled in the art. Streams of these analog values can then be transmitted by the transceiver 504 to the security devices 200. The power and frequencies of the transceiver 504 should be selected to maximize coverage of the volume in which the containers 412 reside so that all security devices 200 in the hull 500 can receive this signal. (In the alternative, the retransmitted RF can also occur digitally over a wired or wireless network to the containers involved.) Optionally encryption algorithms can be used to store information on containers 412 and/or the voyage computer 408 and the encryption algorithms can be used to protect the transmitted data packets between the querying computer and each of the wired or wireless containers. In this case, randomly selected sections of the authentication table on each security device 200 or on the voyage computer 408 can be employed as keys, seeds or personal identification numbers to be used by the encryption algorithms as dynamic keys to make decryption more difficult.

In one embodiment, each new jitter value received during the voyage is added to a jitter value generated at the port of origin to create a combined jitter value. The particular port jitter value used can be determined randomly, or by any other means. The combined jitter values create an incalculable "signature" that permeates the chamber in which containers 412 are held so that continually changing combined jitter values unique to the vessel 402 are added to ambient, external signatures. Only those containers 412 present within the hull 500 can capture the combined jitter values generated by the voyage computer 408 and transmitted from the ship transceiver 504. As a result, the removal of a container 412 will cause it to lose contact with the combined jitter values from within the hull 500, and the absence of any combined jitter value can be detected as an anomaly. These anomalies will activate an alert and be acted upon, including the authentication of the vessel and its geo-location and transmission of a duress code to remote trusted parties.

As the containership 402 moves, the combined jitter values are captured by each container's 412 security device 200. These combined jitter values reflect a combination of the local naturally occurring RF and an artificially imposed RF that is generated by the ship RF transceiver 504 within the hull 500. Generation of the artificial RF is based on the authentication table of values that was provided to the voyage computer 408 for its journey by the hardware that captured them at a specific location at the port of origin and establishes the values originated at the port and nowhere else. As a result, a substructure component is created that can be recognized as belonging to the port of origin and the vessel 402 and its containers 412 for the journey. This system binds the vessel 402 and the containers 412 it carries to their port of origin; since the retransmitted identifiers are physics-based and cannot be predicted, calculated or guessed, these identifiers cannot be spoofed.

As mentioned above, the absence of any combined jitter value from an authentication table of any security device 200 will create an immediate mismatch that can be used to identify suspect containers 412 and correlate the absence to time and geo-location. Furthermore, multiple RF frequency bands can be selected that optimize or enhance the operation of the system in a particular container setting. It should be noted that conventional encryption tools, biometrics, and other systems that contribute to the authentication process can be combined with the system to protect the contents of the authentication tables.

In one embodiment, the voyage computer 408 can query each security device 200 using the ship transceiver 504 at select time intervals during the voyage check the integrity of the containers 412. In this embodiment, the voyage computer 408 queries a security device 200 as to what is stored at a particular location within its authentication table. If the security device 200 reports back the correct value (i.e. the value matches the value in the secure database for the containers profile at that table location), the associated container 412 is deemed to be present and allowed to have the next combined jitter value.

However, if the container 412 is missing during the query, the time of the query will be noted as will the location of the containership 402 at the time of the unusual occurrence. "Missing" as used here, can mean the container 412 was actually physically missing from the vessel 402, or that the security device 200 was somehow inoperable at the time of the query. For example, the security device 200 could have been breached and therefore inoperable at the time of the query. When discontinuity is discovered, an alarm can be sent to the captain, to the port, to the coast guard, or to any other destination. As a result, authorities can respond to the alarm, for example, by not allowing the vessel to enter port, or by forcing an inspection of the vessel 402.

In one embodiment, the security device 200 can be designed such that any violation of the container's 412 integrity (through breach or other action) causes the related authentication table to change its contents in a dramatic and recognizable way. For example, the entire authentication table can be erased, or a new entry can be introduced reflecting the location at which the change occurred (i.e., for forensic purposes), or all future additions to the table can become zeroes thereby enabling the identification of the precise time and location at which the breach occurred. In this manner, an immediate and unquestionable alert is generated for detection by the vessel's operator and/or remote authorities at the ports of origin and destination.

Prior to and upon arrival at the destination, the current authentication tables on each of the containers 412 can be compared to those that were issued by examining the secure databases. Anomalies can be employed to identify and locate those containers 412 whose authentication tables are not as expected. Moreover, the precise location of any suspicious container whose authentication table are not what is expected within the vessel's 402 storage chamber can be calculated for alerting the vessel's operator, distant officials at both the port of origin and the destination port, and local boarding officials. This facilitates the rapid inspection and/or isolation of the suspicious container before it enters a protected zone.

In one embodiment, the secure database having all the container profile information, including voyage combined jitter updates, is transmitted to authorities at a destination port for comparison against expected values and a computer search for anomalies. Vessels 402 without anomalous container authentication tables are allowed an expedited entry into the port, while vessels 402 with anomalies on board are held outside of the safe perimeter until the offending containers 412 are removed and/or inspected.

Referring back to FIG. 1, post process operations are performed in operation 110. Post process operations can include, for example, examining the security device authentication tables for each container, comparing authentication tables with container profile records, and other post process operations that will be apparent to those skilled in the art after a careful reading of the present disclosure.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for monitoring an item, comprising the operations of:
   transmitting values from a transmitter to a security device associated with an item, the security device including an authentication table having a plurality of initial jitter values received at a point of origin, each jitter value being based on a difference in arrival times of at least two timing signals from the same remote source, wherein the security device includes an authentication table having a plurality of initial values;
   recording the values received from the transmitter in the authentication table;
   receiving timing signals from a remote source at a computer;

sending the values from the computer to the transmitter, the values being based on the timing signals received from the remote source, wherein the values from the computer are combined jitter values based on the initial jitter values and the jitter values received from a receiver.

2. A method as recited in claim 1, wherein the point of origin is a port.

3. A method as recited in claim 1, wherein each combined jitter value is generated by adding an initial jitter value to a jitter value received from the receiver.

4. A method as recited in claim 1, further comprising the operation of querying the security device prior to transmitting a new value to the security device.

\* \* \* \* \*